United States Patent
Burns et al.

(10) Patent No.: US 11,303,624 B2
(45) Date of Patent: *Apr. 12, 2022

(54) SYSTEMS AND METHODS FOR MULTI-FACTOR LOCATION-BASED DEVICE VERIFICATION

(71) Applicant: American Wagering, Inc., Las Vegas, NV (US)

(72) Inventors: James Burns, Las Vegas, NV (US); Junqiao Ai, Las Vegas, NV (US); Stephen Denham, Las Vegas, NV (US); Mike Schear, Las Vegas, NV (US); Adam Goldstein, Las Vegas, NV (US); Brett Larson, Las Vegas, NV (US)

(73) Assignee: AMERICN WAGERING, INC., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/073,971

(22) Filed: Oct. 19, 2020

(65) Prior Publication Data
US 2021/0049865 A1 Feb. 18, 2021

Related U.S. Application Data

(63) Continuation-in-part of application No. 15/632,789, filed on Jun. 26, 2017, now Pat. No. 10,812,458.

(51) Int. Cl.
*H04L 29/06* (2006.01)
*G07F 17/32* (2006.01)
(Continued)

(52) U.S. Cl.
CPC .............. *H04L 63/08* (2013.01); *G01S 19/51* (2013.01); *G06K 9/00288* (2013.01);
(Continued)

(58) Field of Classification Search
CPC ...... H04W 4/02; H04W 12/06; H04L 63/107; H04L 63/0861; H04L 63/08; G06Q 50/34
See application file for complete search history.

(56) References Cited

U.S. PATENT DOCUMENTS 7,198,571 B2    4/2007  Lemay et al.
7,471,954 B2 *  12/2008 Brachet ..................... G01S 5/02
                                                   342/450
(Continued)

OTHER PUBLICATIONS

Wang, Gang, et al. "Defending against sybil devices in crowdsourced mapping services." Proceedings of the 14th annual international conference on mobile systems, applications, and services. 2016, pp. 179-191. (Year: 2016).*

(Continued)

*Primary Examiner* — Kari L Schmidt
(74) *Attorney, Agent, or Firm* — Armstrong Teasdale LLP

(57) ABSTRACT

A system for multi-factor location-based device verification is configured to receive a first location factor, which may include GPS data, from a client device. The system is also configured to receive one or more additional location factors, such as a second location factor and/or a third location factor, from first and/or second wireless beacons, respectively. The wireless beacons may be located within a predefined area, such as a sports book or another casino area, and the system may determine, based upon the one or more location factors, whether the client device is within the predefined area. As a result, the location of the client device may be verified based upon one or more location factors. In addition, in response to verifying the location of the client device, a new wagering account may be established and/or wagering may be initiated.

20 Claims, 5 Drawing Sheets

(51) Int. Cl.
| | |
|---|---|
| *H04W 12/06* | (2021.01) |
| *G06Q 50/34* | (2012.01) |
| *G06K 9/00* | (2022.01) |
| *G06Q 50/26* | (2012.01) |
| *G01S 19/51* | (2010.01) |
| *H04L 67/52* | (2022.01) |
| *H04L 67/306* | (2022.01) |
| *G06Q 30/00* | (2012.01) |
| *H04W 12/63* | (2021.01) |
| *H04W 4/02* | (2018.01) |

(52) U.S. Cl.
CPC ....... *G06Q 30/0185* (2013.01); *G06Q 50/265* (2013.01); *G06Q 50/34* (2013.01); *G07F 17/3241* (2013.01); *G07F 17/3288* (2013.01); *H04L 63/0861* (2013.01); *H04L 63/107* (2013.01); *H04L 67/18* (2013.01); *H04L 67/306* (2013.01); *H04W 4/02* (2013.01); *H04W 12/06* (2013.01); *H04W 12/63* (2021.01)

(56) References Cited

U.S. PATENT DOCUMENTS

| | | | |
|---|---|---|---|
| 8,226,471 | B2 | 7/2012 | Sylla et al. |
| 8,267,792 | B2 | 9/2012 | Buchholz et al. |
| 8,292,741 | B2 | 10/2012 | Burman et al. |
| 8,616,981 | B1 | 12/2013 | Guinn et al. |
| 8,925,434 | B2 | 1/2015 | Omura et al. |
| 9,053,604 | B2 | 6/2015 | Sylla |
| 9,129,333 | B2 | 9/2015 | Hardie et al. |
| 9,380,421 | B1 | 6/2016 | Vltavsky |
| 9,430,909 | B2 | 8/2016 | Shore et al. |
| 9,521,521 | B2 | 12/2016 | Hillary et al. |
| 9,524,619 | B2 | 12/2016 | Colvin et al. |
| 9,741,237 | B1 | 8/2017 | Knasi et al. |
| 10,198,899 | B2 | 2/2019 | Yang |
| 2001/0003099 | A1 | 6/2001 | Von Kohorn |
| 2002/0147049 | A1 | 10/2002 | Carter et al. |
| 2003/0236120 | A1 | 12/2003 | Reece et al. |
| 2004/0128157 | A1 | 7/2004 | Aquilino et al. |
| 2006/0035712 | A1 | 2/2006 | Eastman et al. |
| 2006/0183462 | A1 | 8/2006 | Kolehmainen |
| 2007/0054739 | A1 | 3/2007 | Amaitis et al. |
| 2007/0197247 | A1 | 8/2007 | Inselberg |
| 2008/0076505 | A1 | 3/2008 | Nguyen et al. |
| 2008/0076572 | A1 | 3/2008 | Nguyen et al. |
| 2008/0096628 | A1 | 4/2008 | Czyzewski et al. |
| 2008/0102956 | A1 | 5/2008 | Burman et al. |
| 2008/0207335 | A1 | 8/2008 | DiMichele |
| 2010/0017261 | A1 | 1/2010 | Evans et al. |
| 2010/0035679 | A1 | 2/2010 | Oram |
| 2010/0069144 | A1 | 3/2010 | Curtis et al. |
| 2010/0321499 | A1 | 12/2010 | Ortiz et al. |
| 2012/0046110 | A1 | 2/2012 | Amaitis et al. |
| 2012/0058813 | A1 | 3/2012 | Amaitis et al. |
| 2012/0159584 | A1 | 6/2012 | Pizot et al. |
| 2013/0091452 | A1 | 4/2013 | Sorden et al. |
| 2014/0057706 | A1 | 2/2014 | Merrill |
| 2014/0194192 | A1 | 7/2014 | Pierce, II et al. |
| 2014/0236700 | A1 | 8/2014 | Abhyanker |
| 2014/0254466 | A1 | 9/2014 | Wurster et al. |
| 2015/0084584 | A1 | 3/2015 | Monks et al. |
| 2015/0245180 | A1 | 8/2015 | Lin et al. |
| 2015/0289125 | A1 | 10/2015 | Vinh et al. |
| 2016/0007184 | A1 | 1/2016 | Kulikov |
| 2016/0012426 | A1 | 1/2016 | Chitilian et al. |
| 2016/0091549 | A1 | 3/2016 | Snook et al. |
| 2016/0140804 | A1 | 5/2016 | Morgan |
| 2016/0343194 | A1 | 11/2016 | Allen et al. |
| 2016/0381038 | A1 | 12/2016 | Disraeli et al. |
| 2017/0061731 | A1 | 3/2017 | Colvin et al. |
| 2018/0033244 | A1* | 2/2018 | Northrup ............... G08G 1/149 |
| 2018/0270605 | A1 | 9/2018 | Wang et al. |
| 2018/0374099 | A1 | 12/2018 | Litsur et al. |
| 2019/0110111 | A1* | 4/2019 | Huske .................. H04N 21/442 |
| 2019/0364039 | A1* | 11/2019 | Chandrasekaran .. G06Q 20/204 |
| 2020/0061454 | A1* | 2/2020 | Merati .................. A63F 13/211 |

OTHER PUBLICATIONS

W. Jansen and V. Korolev, "A Location-Based Mechanism for Mobile Device Security," 2009 WRI World Congress on Computer Science and Information Engineering, 2009, pp. 99-104 (Year: 2009).*

H. Jonsson, P. Nugues, A. Tavella, I. Amaral, M. Tachibana and V. Santos, "Proximity-based reminders using Bluetooth," 2014 IEEE International Conference on Pervasive Computing and Communication Workshops (PERCOM Workshops), Budapest, 2014, pp. 151-153. (Year: 2014).

Cottin, Nathanael, and Maxi me Wack. "Dynamic registration and discovery of location-based services using spatial registries. Proceedings of the 3rd workshop on Agent-oriented software engineering challenges for ubiquitous and pervasive computing." 2009. pp. 33-38. (Year: 2009).

Chow, Chi-Yin, Jie Bao, and Mohamed F. Mokbel. "Towards location-based social networking services." Proceedings of the 2nd ACM SIGSPATIAL International Workshop on Location Based Social Networks. 2010. pp. 31-38. (Year: 2010).

* cited by examiner

SYSTEMS AND METHODS FOR MULTI-FACTOR LOCATION-BASED DEVICE VERIFICATION

CROSS-REFERENCE TO RELATED APPLICATION

This application is a continuation-in-part of and claims the benefit of and priority to U.S. application Ser. No. 15/632,789, filed on Jun. 26, 2017 and entitled SYSTEMS AND METHODS FOR TWO-FACTOR LOCATION-BASED DEVICE VERIFICATION, which is hereby incorporated by reference in its entirety.

BACKGROUND

The subject matter disclosed herein relates to systems and methods for device verification and, more particularly, to systems and methods for multi-factor location-based device verification, in which a physical location of a device, such as a mobile communications device within a casino sports book, is verified based upon a plurality of location factors.

Multi-factor authentication systems, such as two-factor authentication systems, have been developed to authenticate a user's identity, such as, for example, based upon at least two pieces of information. For example, a traditional two-factor authentication system may authenticate the user based upon a password provided to the system by the user and a second piece of information known only to the user, such as a one-time verification code, generated by the system and delivered to the user for the purpose of authenticating the user to the system at the time the user requests access. Such two-factor authentication processes have not, however, been implemented for verification purposes, such as, for example, for the purpose of verifying the location of a user or of a device of the user. Rather, as described herein, most conventional two-factor systems are merely configured for the purpose of authenticating the identity of a user.

In addition, in the casino gaming industry, the proliferation of mobile communication devices, such as smartphones, has led to the development of technologies and systems for the implementation of casino games that may be played on mobile communications devices. To implement a casino game on a mobile communications device, however, many gaming jurisdictions within the United States require some form of verification that the user of the mobile communications device is physically located on the casino property. To satisfy this requirement, some known systems include a mobile communications device that is temporarily issued to a user by the casino. The presence of the user (as well as the mobile communications device) on the casino property is thus ensured by the casino's control over, and ownership of, the mobile communications device.

Such conventional systems are deficient, however, in that many casino patrons would prefer to play casino games, or to place wagers, from their personal mobile communications devices (e.g., from their personal smartphones). Traditionally, such systems have been difficult to implement, particularly where it is necessary to ensure that the casino patron is physically located within a particular casino property. For example, the verification processes implemented by many conventional location-based verification systems can be circumvented by users, such as, for example, by spoofing a device location, such that the device appears to be located within a particular casino property irrespective of the actual device location.

In addition, at least some drawbacks associated with traditional location-based verification techniques are exacerbated under circumstances that require more precise location-based verification of a mobile communications device within a casino. For example, in order to permit a user to place wagers within a casino sports book from a mobile communications device, it may be necessary to verify that the user is within the casino itself and that the user is within the area of the sports book. Thus, under certain circumstances, a more precise verification of a user's location within a casino may be necessary.

Systems and methods for more reliably verifying the physical location of a mobile communications device are therefore desirable. More specifically, systems and methods for multi-factor verification of a device location are desirable, particularly systems and methods capable of multi-factor verification of a physical location of a mobile communications device within a predetermined location, such as a predetermined location configured within software and pushed out to a mobile application executing on the mobile communications device. In some instances, such a predetermined location may include a sports book of a casino.

BRIEF DESCRIPTION

In one aspect, a system for multi-factor location-based device verification is provided. The system includes a processor and a non-transitory, tangible, computer-readable storage medium having instructions stored thereon that, in response to execution by the processor, cause the processor to perform operations including: (i) receiving, from a client device of a user, a request to register for a new wagering account; (ii) receiving, from the client device, a first location factor, the first location factor including global positioning system (GPS) data received from a source device located outside a predefined area, the first location factor being used to provide map directions to the predefined area; (iii) receiving, from the client device, a second location factor, the second location factor including information received from a first wireless beacon located within the predefined area; (iv) receiving, from the client device, a third location factor, the third location factor including information received from a second wireless beacon located within the predefined area; (v) determining, based at least upon the second location factor and the third location factor, that the client device is within the predefined area; and (vi) creating, in response to the determining, the new wagering account for the user of the client device.

In another aspect, a method for multi-factor location-based device verification is provided. The method includes: (i) receiving, from a client device of a user, a request to register for a new wagering account; (ii) receiving, from the client device, a first location factor, the first location factor including global positioning system (GPS) data received from a source device located outside a predefined area; (iii) receiving, from the client device, a second location factor, the second location factor including information received from a first wireless beacon located within the predefined area; (iv) receiving, from the client device, a third location factor, the third location factor including information received from a second wireless beacon located within the predefined area; (v) determining, based at least upon the second location factor and the third location factor, that the client device is within the predefined area; and (vi) creating, in response to the determining, the new wagering account for the user of the client device.

In yet another aspect, an article of manufacture is provided. The article of manufacture includes a tangible, non-transitory, computer-readable storage medium having instructions stored thereon, which when executed by a processor for multi-factor location-based device verification, cause the processor to perform operations comprising: (i) receiving, from a client device of a user, a request to register for a new wagering account; (ii) receiving, from the client device, a first location factor, the first location factor including global positioning system (GPS) data received from a source device located outside a predefined area; (iii) receiving, from the client device, a second location factor, the second location factor including information received from a first wireless beacon located within the predefined area; (iv) receiving, from the client device, a third location factor, the third location factor including information received from a second wireless beacon located within the predefined area; (v) determining, based at least upon the second location factor and the third location factor, that the client device is within the predefined area; and (vi) creating, in response to the determining, the new wagering account for the user of the client device.

BRIEF DESCRIPTION OF DRAWINGS

These and other features, aspects, and advantages of the present disclosure will become better understood when the following detailed description is read with reference to the accompanying drawings in which like characters represent like parts throughout the drawings, wherein.

Figure 1:
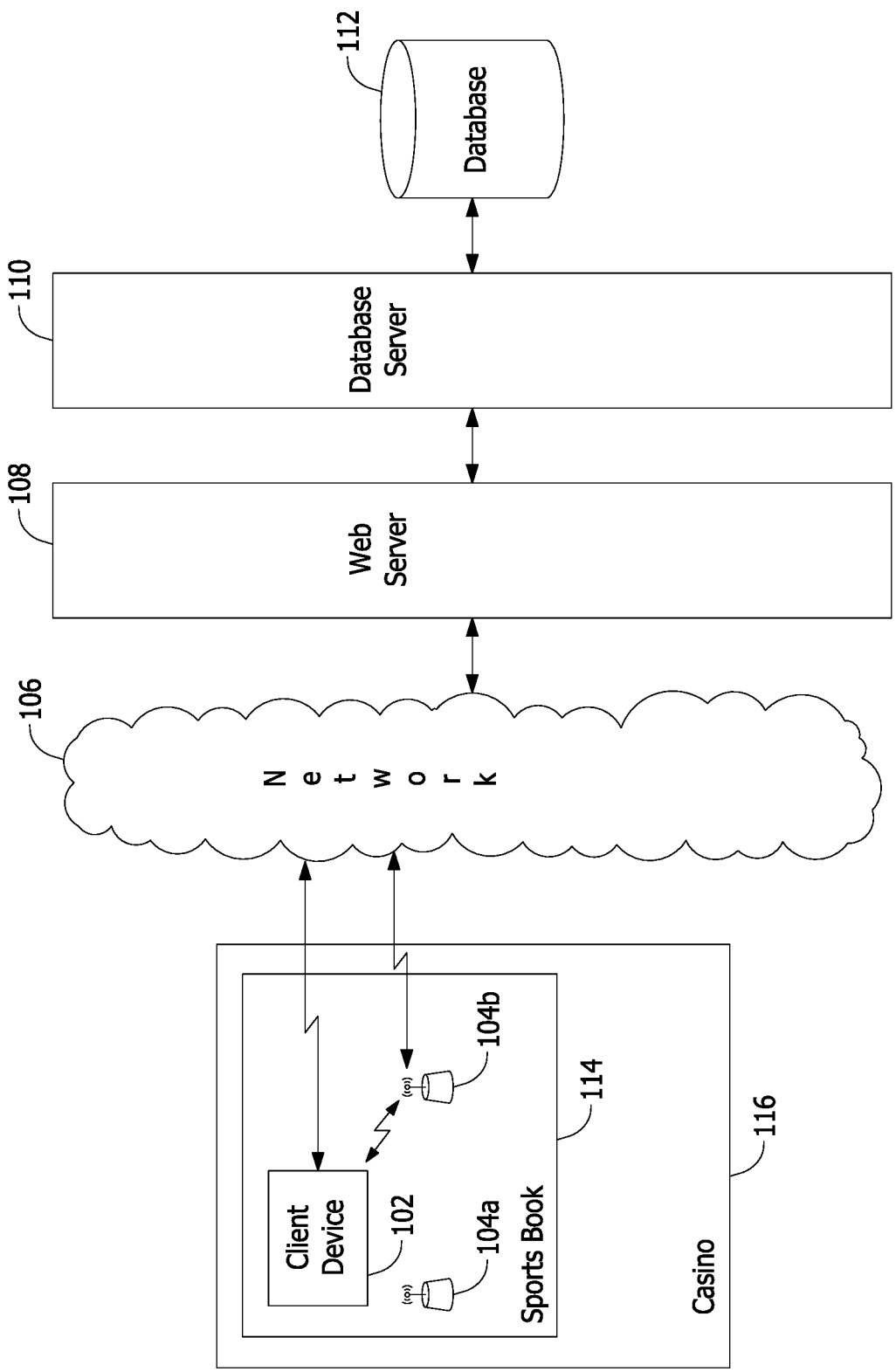
FIG. 1 is a schematic view of an exemplary multi-factor location-based device verification system.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer" and related terms, e.g., "processing device," "computing device", and "controller" are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory includes, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with a user interface such as a mouse and a keyboard. Alternatively, other computer peripherals may also be used that may include, for example, but not be limited to, a scanner. Furthermore, in the exemplary embodiment, additional output channels may include, but not be limited to, a user interface monitor.

Further, as used herein, the terms "software" and "firmware" are interchangeable, and include any computer program stored in memory for execution by personal computers, workstations, clients and servers.

As used herein, terms like "non-transitory computer-readable storage media" are intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable storage media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As used herein, a "location factor" or a "verification factor" may include any data that may be used to determine a physical location of a client device and/or any data that may be used in a process, as described herein, for verifying a physical location of a device. For example, a location factor may include global positioning system (GPS) data and/or data broadcast by and/or received from a wireless beacon, such as an identifier (e.g., a universally unique identifier or UUID) broadcast by and/or received from a wireless beacon.

In addition, as used herein, a "first location factor" may, in some cases, refer to GPS data. Likewise, as used herein, a "second location factor" and/or a "third location factor"

may, in some cases, refer to data broadcast by and/or received from a first wireless beacon and a second wireless beacon, respectively. However, the ordinals, "first," "second," "third," and so on should not be construed as limiting. Rather, where they occur, such ordinals are used merely for the purpose of distinguishing one location factor from another location factor. Further, although the examples described herein may incorporate first, second, and/or third components, such as first and second wireless beacons and first, second, and third location factors, it will be appreciated that any suitable number of wireless beacons may be implemented in accordance with the present disclosure as well as that any suitable number of location factors may be used to determine and/or verify a location of a client device.

Embodiments of the present disclosure relate to a multi-factor location-based device verification system. In some examples, two-factors may be used to verify a device location, such as GPS data and a wireless beacon data. In other embodiments, three or more factors may be used to verify a device location, such as GPS data and wireless beacon data broadcast by two or more wireless beacons and/or, in at least some embodiments, a device location may be verified indoors (e.g., within a sports book) using two or more location factors received from wireless beacons positioned within the sports book.

The system thus facilitates multi-factor verification of a physical location of a client device, such as a mobile communications device, within a predetermined location, such as a casino sports book. The system may ensure that the client device is physically located within the sports book based upon one or more of a first location or verification factor, such as at least one GPS coordinate, a second location or verification factor, such as a unique identifier broadcast by and received from a wireless beacon disposed within the casino sports book, and/or a third location or verification factor, such as another (different) unique identifier broadcast by and received from a different wireless beacon within the sports book. In various embodiments, and as described herein, any suitable combination of these three location factors may be used.

The system may further register a user to a new wagering account based upon a comparison of a self-photograph of a user of the client device taken from the client device to a driver's license photograph. In some embodiments, the system may permit the user to initiate a registration process from a location that is outside of a sports book, but may require that the user enter the sports book to complete the registration process. In various embodiments, once a user has successfully registered for a wagering account, the user may be permitted by the system to place wagers on sporting events from within and/or from without the sports book.

FIG. 1 is a perspective view of an exemplary two-factor location-based verification system 100. In the exemplary embodiment, system 100 includes a client device 102, a first wireless beacon 104a, a second wireless beacon 104b, a computer network 106, a web server 108, a database server 110, and/or a database 112. As described below, client device 102 may be a mobile communications device, such as a smartphone or a tablet. Accordingly, client device 102 may be transported by a user from location to location. However, as shown, and as described herein, during operation, client device 102 may be physically located within or physically transported to an area of a sports book 114 within a casino 116. As used herein, and for simplicity, first wireless beacon 104a and second wireless beacon 104b may be collectively referred to as wireless beacons 104 or wireless beacons 104a-b.

Accordingly, in the exemplary embodiment, client device 102 may be any personal computing device and/or any mobile communications device of a user, such as a personal computer, a tablet computer, a smartphone, and the like. Client device 102 may be configured to present an application (e.g., a smartphone "app") or a webpage, such as webpage or an app for authenticating a user to system 100 and/or an a webpage or app for registering for account access. To this end, client device 102 may include or execute software for viewing and interacting with a webpage and/or an app.

Wireless beacons 104a and 104b may be located within casino 116 and/or within sports book 114 and may be any suitable electronic device capable of wirelessly transmitting and/or receiving data via one or more communications protocols. In the exemplary embodiment, wireless beacons 104a and 104b are located within sports book 114. For example, in some embodiments, wireless beacons 104a-b may be configured to transmit and/or receive a low energy BLUETOOTH signal and/or a WiFi signal. More particularly, in some embodiments, wireless beacons 104a-b include APPLE iBEACON and/or a GOOGLE EDDYSTONE beacons. Wireless beacons 104a-b may, in addition, be configured to transmit location factors, such as universally unique identifiers (or UUIDs), which may include, in some embodiments, rotating combinations of hexadecimal digits. These location factors may uniquely identify wireless beacons 104a-b, and to transmit the location factors, wireless beacons 104a-b may communicate with a backend server, such as web server 108, which may provide the location factors (e.g., rotating UUIDs) to wireless beacons 104a-b for broadcast.

The location factors broadcast by wireless beacons 104a-b may be received by client device 102 and used, as described herein, for the purpose of verifying that client device 102 is physically located within sports book 114. In addition, in some embodiments, wireless beacons 104a-b may independently generate location factors, in which case, wireless beacons 104a-b may provide the independently generated location factors to web server 108 at substantially the same time that they are broadcast for reception by client device 102. Accordingly, location factors may be generated by web server 108 and/or by wireless beacons 104a-b themselves.

Network 106 may be any electronic communications system, such as any computer network or collection of computer networks, and may incorporate various hardware and/or software. Communication over network 106 may be accomplished via any suitable communication channels, such as, for example, one or more telephone networks, one or more extranets, one or more intranets, the Internet, one or more point of interaction devices (e.g., point of sale devices, smart phones, cellular phones), one or more electronic gaming machines, such as one or more electronic gaming machines located within casino 116, various online and/or offline communications systems, such as various local area and wide area networks, and the like.

Web server 108 may be any computer or computer system that is configured to receive and process requests made via HTTP. Web server 108 may be coupled between client device 102 and database server 110. More particularly, web server 108 may be communicatively coupled to client device 102 via network 106. In various embodiments, web server 108 may be directly coupled to database server 110 and/or communicatively coupled to database server 110 via a network, such as network 106. In some embodiments, communications between web server 108 and client device 102 may be implemented by way of a secure encrypted connection and/or communications protocol, such as an HTTPS connection and/or any other secure encrypted connection and/or communications protocol. Web server 108 may, in addition, function to store, process, and/or deliver one or more web pages and/or any other suitable content to client device 102. Web server 108 may, in addition, receive data, such as data provided to the app and/or webpage (as described herein) from client device 102 for subsequent transmission to database server 110.

In various embodiments, web server 108 may implement various hardware and/or software, such as, for example, one or more communication protocols, one or more message brokers, one or more data processing engines, one or more servlets, one or more application servers, and the like. For instance, in various embodiments, web server 108 may implement a message broker program module configured to translate a message or communications from a messaging protocol of a sending device to a messaging protocol of a receiving device (e.g., RABBITTMQ, KAFKA, ACTIVEMQ, KESTREL). Further still, in some embodiments, web server 108 may implement a data processing engine, such as a cluster computing framework like APACHE SPARK. In addition, in various embodiments, web server 108 may implement servlet and/or JSP server, such as APACHE TOMCAT. In some embodiments, web server 108 may function to process data received from client device 102, such as authentication and/or location verification data, which may include, for example, a first location factor (e.g., GPS data), and/or second and/or third location factors (e.g., wireless beacon data).

Database server 110 may be any computer or computer program that provides database services to one or more other computers or computer programs. In various embodiments, database server 110 may be communicatively coupled between web server 108 and database 112. Database server 110 may, in addition, function to process data received from web server 108, such as authentication and/or location verification data, which may include, for example, a first location factor (e.g., GPS data) and/or one or more location factors (e.g., wireless beacon data).

Database 112 may be any organized collection of data, such as, for example, any data organized as part of a relational data structure, any data organized as part of a flat file, and the like. Database 112 may be communicatively coupled to database server 110 and may receive data from, and provide data to, database server 110, such as in response to one or more requests for data, which may be provided via a database management system (DBMS) implemented on database server 110. In various embodiments, database 112 may be a non-relational database, such as an APACHE HADOOP database.

Although components of system 100 are described below and depicted at FIG. 1 as being interconnected in a particular configuration, it is contemplated that the systems, subsystems, hardware and software components, various network components, and database systems described herein may be variously configured and interconnected and may communicate with one another within system 100 to facilitate the processes and advantages described herein. For example, although two wireless beacons 104a-b, a single web server 108, a single database server 110, and a single database 112 are described above, it will be appreciated that system 100 may include any suitable number of interconnected, communicatively coupled, wireless beacons, web servers, database servers, and/or databases. For example, a predefined area, as described herein (e.g., a sports book) may include a plurality of wireless beacons 104, such as, for example, depending upon a wireless range of the wireless beacons 104 being used and a square footage of the sports book, the number of wireless beacons 104 being selected in this example to ensure that a client device 102 anywhere within the sports book is within wireless range of at least one (and in some cases more than one) wireless beacon 104a-b. Further, although certain functions, processes, and operations are described herein with respect to one or more system components, it is contemplated that one or more other system components may perform the functions, processes, and operations described herein.

Figure 2:
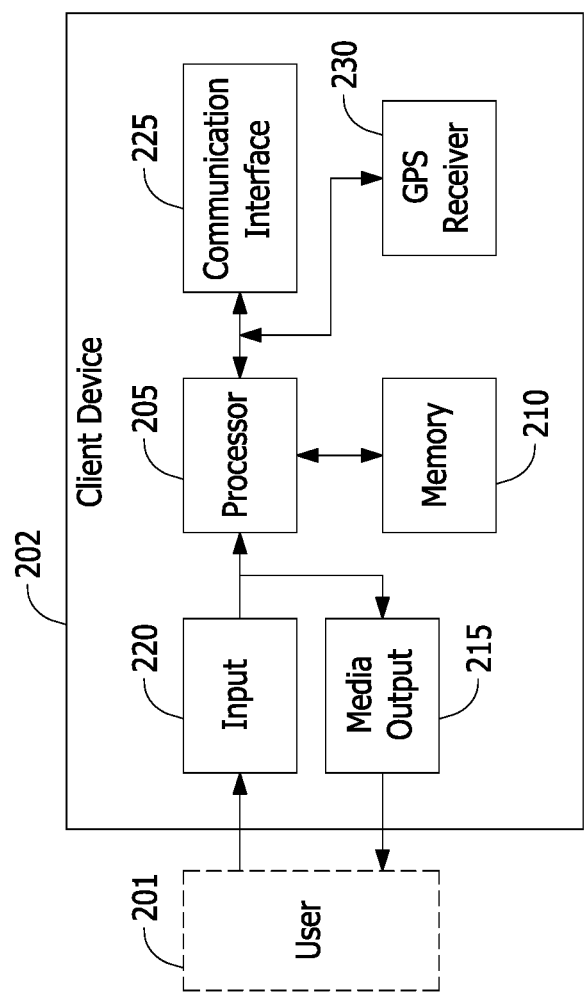
FIG. 2 is a schematic view of an exemplary client device, such as the client device shown in FIG. 1.

FIG. 2 is a schematic view of an exemplary client device 202, such as, for example, client device 102 (shown in FIG. 1). Accordingly, in various embodiments, client device 202 may be operated by a user 201. Client device 202 may include a processor 205 for executing instructions. In some embodiments, executable instructions may be stored in a memory area 210. Processor 205 may include one or more processing units (e.g., in a multi-core configuration). Memory area 210 may be any device allowing information such as executable instructions and/or transaction data to be stored and retrieved. Memory area 210 may include one or more computer readable media.

Client device 202 may also include at least one media output component 215 for presenting information to user 201. Media output component 215 may be any component capable of conveying information to user 201. In some embodiments, media output component 215 may include an output adapter (not shown) such as a video adapter and/or an audio adapter. An output adapter may be operatively coupled to processor 205 and adapted to operatively couple to an output device such as a display device (e.g., a cathode ray tube (CRT), liquid crystal display (LCD), light emitting diode (LED) display, or "electronic ink" display) or an audio output device (e.g., a speaker or headphones).

In some embodiments, media output component 215 may be configured to present a graphical user interface (e.g., a web browser and/or a client application) to user 201. A graphical user interface may include, for example, an online store interface for viewing and/or purchasing items, and/or a wallet application for managing payment information. In some embodiments, client device 202 may include an input device 220 for receiving input from user 201. User 201 may use input device 220 to, without limitation, select and/or enter data, such as, for example, one or more report criteria or report filters.

Input device 220 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 215 and input device 220.

Client device 202 may also include a communication interface 225, communicatively coupled via network 106 to web server 108 and/or database server 110 (shown in FIG. 1). Communication interface 225 may include, for example, a wired or wireless network adapter and/or a wireless data transceiver for use with a mobile telecommunications network. In some embodiments, communication interface 225 may be configured to communicate with and/or receive data, such as one or more location factors, from one or more wireless beacons 104a-104b. More generally, however, any suitable communication interface, such as any suitable radio frequency, Wi-Fi, or BLUETOOTH transceiver and/or receive may be included to communicate or receive communications from wireless beacons 104a-104b.

Stored in memory area 210 are, for example, computer readable instructions for providing a user interface to user 201 via media output component 215 and, optionally, receiving and processing input from input device 220. A user interface may include, among other possibilities, a web browser and/or a client application. Web browsers enable users, such as user 201, to display and interact with media and other information typically embedded on a web page or a website.

In some embodiments, client device 202 may include a global positioning system (GPS) receiver 230 communicatively coupled to processor 205. GPS receiver 230 may include any suitable GPS receiver that may be implemented within client device 202 and that may be configured to receive GPS data, such as one or more GPS coordinates, from one or more GPS satellites. In some embodiments, GPS receiver 230 may also communicate with one or more cellular system towers to triangulate or otherwise obtain a physical location of client device 202.

Figure 3:
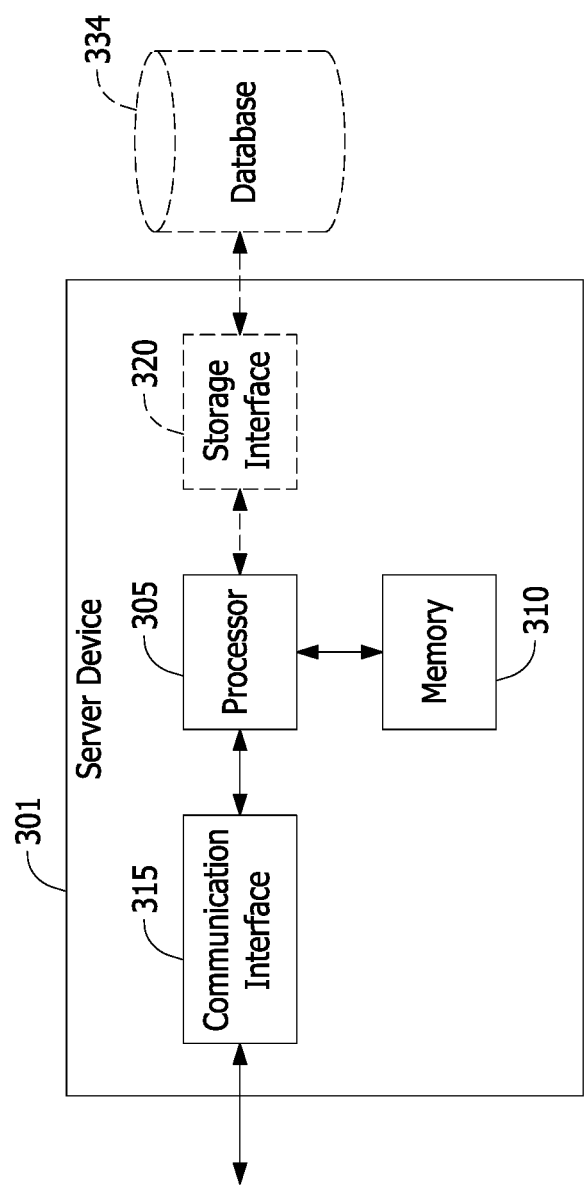
FIG. 3 is a schematic view of an exemplary server, such as one of the servers shown in FIG. 1.

FIG. 3 is a schematic view of an exemplary server computer device 301, such as, for example, either of web server 108 and/or database server 110 (shown in FIG. 1). Accordingly, server computer device 301 may include a processor 305 for executing instructions. Instructions may be stored in a memory area 310. Processor 305 may include one or more processing units (e.g., in a multi-core configuration).

Processor 305 may be operatively coupled to a communication interface 315 such that server computer device 301 is capable of communicating with a remote computing device, as described above. For example, communication interface 315 may receive requests from client device 202 via the Internet and/or over a computer network.

Processor 305 may also be operatively coupled to a storage device 334 (e.g., database 112). Storage device 334 may be any computer-operated hardware suitable for storing and/or retrieving data, such as, but not limited to, data associated with database 320. In some embodiments, storage device 334 may be integrated in server computer device 301. For example, server computer device 301 may include one or more hard disk drives as storage device 334.

In other embodiments, storage device 334 may be external to server computer device 301 and may be accessed by a plurality of server computer devices 301. For example, storage device 334 may include a storage area network (SAN), a network attached storage (NAS) system, and/or multiple storage units such as hard disks and/or solid state disks in a redundant array of inexpensive disks (RAID) configuration.

In some embodiments, processor 305 may be operatively coupled to storage device 334 via a storage interface 320. Storage interface 320 may be any component capable of providing processor 305 with access to storage device 334. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 334.

Figure 4:
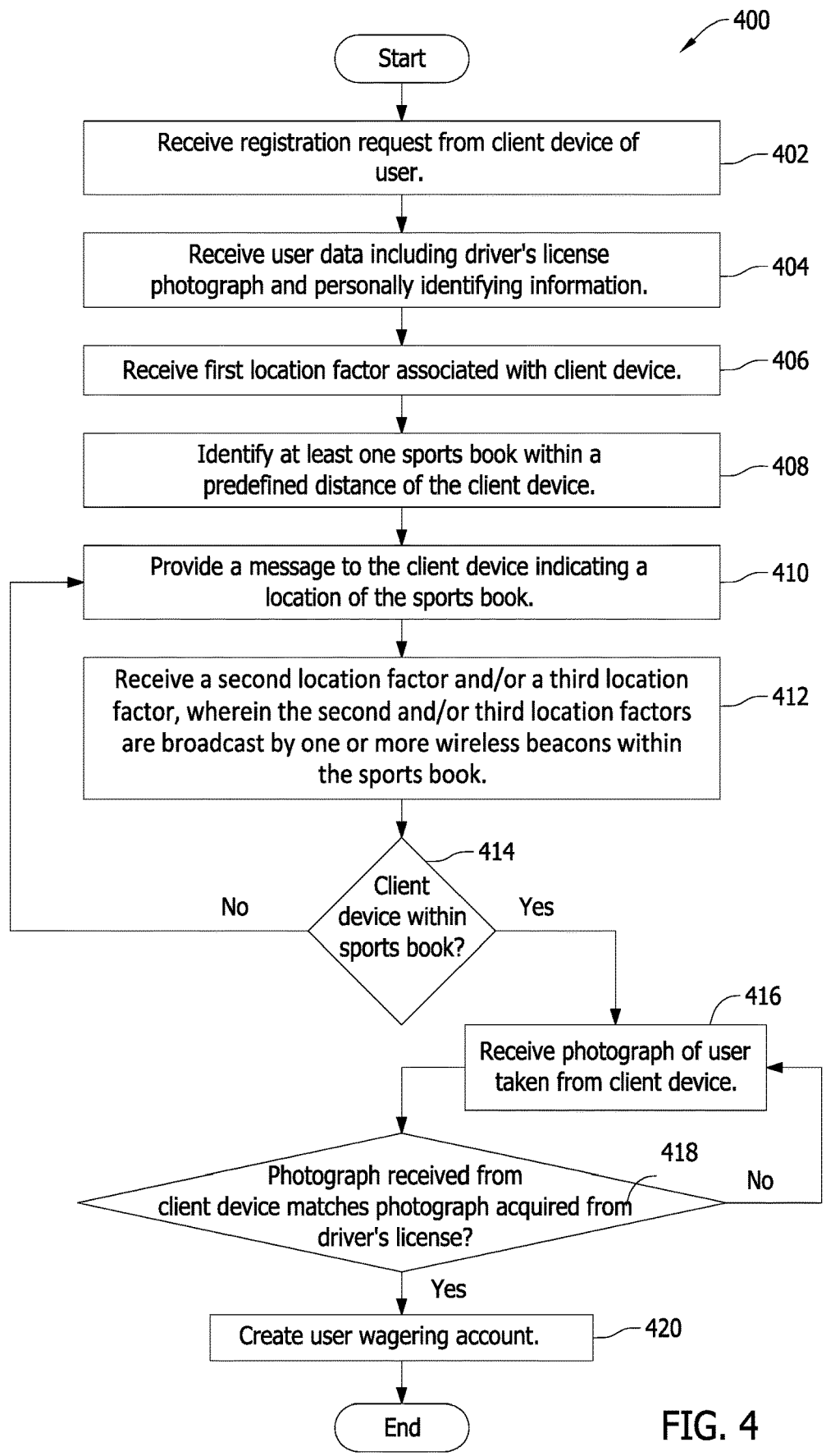
FIG. 4 is a flowchart illustrating an exemplary process for multi-factor location-based device verification.

FIG. 4 is a flowchart illustrating an exemplary process 400 for multi-factor location-based device verification. As described herein, multi-factor location-based device verification may include two-factor verification as well as three-factor verification, and in some embodiments, greater than three factors may be used to verify device location. Accordingly, in the exemplary embodiment, web server 108 may receive a registration request from client device 102, such as, for example, in the case that a user of client device 102 wishes to place a wager on an outcome of a sporting event within sports book 114 (step 402).

In some embodiments, web server 108 may provide a link to a registration webpage, which the user may interact with to register for a new wagering account. In another embodiment, the user may open an application (or "mobile app") on client device 102 to begin registration. The user may also be prompted to use client device 102 to enter personal information and/or scan or photograph the user's driver's license, such that client device 102 acquires an image of the user's driver's license photograph (step 404). The user may also, in some embodiments, be prompted to enter a variety of other personally identifying information, such as, for example, a social security number, a telephone number associated with client device 102, an email address, and/or a password associated with a new wagering account (step 404). However, as described below, this data may be collected during any phase of process 400. In various embodiments, a user may initiate such a registration process from any physical location, such as, for example, from a location that is outside of sports book 114. However, as described herein, to complete the registration process, in the exemplary embodiment, the user may be required to enter or physically travel to the physical location of sports book 114. Thus, the user may, in some embodiments, provide an image of the user's driver's license photograph and/or other personally identifying information from a location that is outside of sports book 114.

In addition, in some embodiments, irrespective of whether web server 108 has received the data described above, web server 108 may receive a first location factor, such as at least one GPS coordinate, associated with client device 102 (step 406). In response, web server 108 may identify at least one predefined physical location, such as sports book 114, within a predefined distance of client device 102 (step 408). As described herein, the predefined physical location may be any suitable predefined physical location, which may be configured and/or stored within software executing on client device 102 and/or pushed to a mobile application executing on client device 102. Thus, although process 400 is described with reference to sports book 114, in various embodiments, any suitable predefined physical location may be selected or utilized during an account registration process. Further, in one embodiment, web server 108 may prompt the user for the driver's license scan and/or other personally identifying information prior to identification of sports book 114.

Having identified at least one sports book 114 within a predefined range or physical distance of client device 102, web server 108 may provide a message to client device 102 indicating the physical location (e.g., the street address and/or a map including a pin drop) of sports book 114 (step 410). In some embodiments, as described herein, the user may receive an ordered list of predefined locations. The user may receive and/or view the location of sports book 114 and, in response, travel to sports book 114. In some embodiments or circumstances, such as, for example, when the user is already very near sports book 114 and/or on the premises of sports book 114, web server 108 may omit the steps described herein that direct the user to sports book 114. Likewise, the user may select an option in the mobile app to indicate that the user has arrived at sports book 114.

Web server 108 may, in various embodiments, standby as the user travels to sports book 114. Once the user has arrived at the physical location of sports book 114, however, web server 108 may receive one or more additional location factors, such as a second location factor and/or a third location factor, from client device 102 (step 412). In some embodiments, as described herein, client device may receive location factors (e.g., beacon identifiers) from web server 108. As a result, in various embodiments, either client device 102 or web server 108 may verify one or more beacon identifiers. Stated another way, and as described herein, beacon verification may be performed on a front end of system 100 (e.g., by client device 102), on a backend of system 100 (e.g., by web server 108), and/or a combination of both.

As described herein, the second location factor may include a unique identifier that is received by client device 102 from first wireless beacon 104a. Likewise, the third location factor may include a unique identifier that is received by client device 102 from second wireless beacon 104b. The third location factor may be different from the second location factor for added security (and, e.g., because, as described above, location factors may rotate or change over time and include unique and/or randomly generated alphanumeric or hexadecimal digits). In some embodiments, client device 102 may "pair" with wireless beacons 104a-b. However, in other embodiments, client device 102 may simply receive the second and/or third location factors (or a plurality of temporally rotating second and/or third location factors, as described herein) from wireless beacons 104a-b.

In response to receipt of the second and/or third location factors, web server 108 and/or, in some cases, client device 102, may analyze any of the first location factor, the second location factor, and/or the third location factor to verify that client device 102 is in fact physically located within sports book 114 (step 414). For example, web server 108 may verify that client device 102 is physically located within sports book 114 based upon the combination of location factors of the GPS signal (e.g., the first location factor) received from client device 102 within sports book 114 and the unique identifier broadcast by wireless beacon 104a (e.g., the second location factor) received from client device 102. Similarly, in at least some embodiments, web server 108 may verify that client device 102 is physically located within sports book 114 based upon the combination of location factors of the GPS signal (e.g., the first location factor) received from client device 102 within sports book 114, the unique identifier broadcast by wireless beacon 104a (e.g., the second location factor) received from client device 102, and the unique identifier broadcast by wireless beacon 104b (e.g., the third location factor) received from client device 102.

In yet another embodiment, GPS data (e.g., the first location factor) may only be used to determine that the user is outside of sports book 114 and to map the location of one or more predefined locations, such as sports book 114, for the user, as described, while the second and/or third location factors (received from wireless beacons within the sports book) may be used to determine or verify that the user is within sports book 114. For example, in some embodiments, the second and/or third location factors received from wireless beacons 104a and 104b, respectively, may be used to determine that the user is within sports book 114 by triangulating or otherwise determining an indoor position of the user within sports book 114, while the first location factor, which includes GPS data, may only be used to determine an outdoor location of the user prior to entry by the user within sports book 114. However, in at least some embodiments, the first location factor may also be used to determine or verify an indoor location (e.g., in conjunction with one or more wireless beacon signals) of the user, or the first location factor may be used as a standalone data point for determining the location of the user.

In some embodiments, the use of at least two location factors from at least two wireless beacons also allows determining an actual location of client device 102 within sports book 114, such as, for example, by triangulating the location of the client device 102 relative to a plurality of wireless beacons 104a-b and/or simply confirming that client device 102 is within range of the at least two beacons 104a-b. In some embodiments, one or more wireless beacons 104a-b may also be positioned near one or more edges, such as one or more entrances and/or exits, to detect ingress and/or egress by users as they enter and exit sports book 114.

Accordingly, in some embodiments, web server 108 may compare the received GPS coordinates to the GPS coordinates associated with sports book 114 (which may be stored by system 100) to determine the location of client device 102. Similarly, to complete the multi-factor location-based verification process, web server 108 may compare one or more unique identifiers received from client device 102 to the one or more unique identifiers generated by web server 108 and provided (as described above) to wireless beacons 104a-b (e.g., second and third location factors). If, in at least one embodiment, the GPS coordinates received from client device 102 match the GPS coordinates associated with sports book 114 (and/or casino 116, in the case that the GPS coordinates are not insufficiently specific to identify sports book 114) and at least one unique identifier received from client device 102 matches at least one unique identifier generated and stored by web server 108 (and/or database server 110), web server 108 and/or database server 110 may reliably verify that client device 102 is in fact physically located within sports book 114. In addition, as described herein, in at least some embodiments, client device 102 may perform the beacon identifier verification process. For example, client device 102 may receive beacon identifiers from web server 108 and compare these beacon identifiers to beacon identifiers received wirelessly from wireless beacons 1045a-b within sports book 114.

In another embodiment, if at least two unique identifiers (e.g., at least two location factors received from wireless beacons 104, such as the second and third location factors) received from client device 102 match the corresponding location factors stored by web server 108, web server 108 (and/or client device 102) may verify that client device 102 is within sports book 114; in this embodiment, GPS data may be used, as described herein, for the purpose of determining that the user is outside of sports book 114 and/or guiding the user to sports book 114, such as by providing map directions to client device 102.

Accordingly, in various embodiments, if one or both of the GPS coordinates and/or the unique identifiers provided by wireless beacons 104a-b do not match their respective counterparts, a determination may be made that client device 102 is not located within sports book 114 (as well as an outdoor or external location of client device 102), in which case a message may be provided to and/or displayed by client device 102 instructing the user to travel to the location of sports book 114 and/or indicating the physical location of sports book 114 (step 410). In some embodiments, if the user does not travel to the location of sports book 114 within a predetermined period of time, web server 108 may time the registration request out and process 400 may terminate.

However, in the case that web server 108 is able to verify the physical location of client device 102 within sports book 114, web server 108 (and/or client device 102) may prompt the user to use client device 102 to take a self-photograph of the user, such as a photograph of the user's face (e.g., a "selfie") for the purpose of authenticating the user's identity. The user may, in response, use client device 102 to acquire the self-photograph, and client device 102 may transmit the self-photograph to web server 108. In response to receiving the self-photograph, web server 108 (and in some cases another backend system, such as database server 110) may determine whether the self-photograph matches a photograph of the user included in the photograph of the user's driver's license (described above) (steps 416 and 418).

In addition, in some embodiments, web server 108 and/or client device 102 may re-verify the location of client device 102, as described above, in response to receiving the self-photograph. For example, in some embodiments, web server 108 may request and/or receive a second or follow up first location or verification factor and a second or follow up second location or verification factor, such as a second set of GPS coordinates and/or one or more additional unique identifiers received from wireless beacons 104a-b. Web server 108 may thus re-verify, prior to registering the user for a new wagering account, that the user has not departed sports book 114.

Web server 108 (or another backend system) may implement a facial recognition algorithm and/or a computer vision algorithm to determine whether the photograph in the user's driver's license matches the self-photograph taken by the user from client device 102. In some embodiments, the driver's license photograph and the self-photograph may be transmitted to a backend display, such as a display located within casino 116 or sports book 114 back office or cage, where a human operator may view both photographs for analysis and comparison. Thus, in some embodiments, the user's identity may be authenticated or verified by a computer system, such as web server 108, while in other embodiments, a human operator may perform the authentication. Further, in some embodiments, the authentication of the user may be performed by both of a computer system and a human operator, such as, for example, for the purpose of redundancy or added security.

Irrespective of the method by which the user's identity is authenticated, if the self-photograph matches the photograph displayed on the driver's license, web server 108 and/or database server 110 may generate or create a new wagering account for the user, whereupon the user may login to the wagering account to begin placing wagers on sporting events (step 420). For instance, once the user is logged in to a newly created/existing wagering account, and the location of client device 102 is verified as being within a particular gaming jurisdiction (e.g., within a particular state within the United States), web server 108 may grant the user access to the newly created/existing wagering account, whereupon the user may proceed to place one or more wagers on one or more sporting events in conjunction with sports book 114. For example, client device 102 may communicate with web server 108 to place wagers and receive wager outcomes in association with various sporting events. In addition, one or more awards, such as one or more monetary awards or credits associated with one or more monetary awards, may be provided to the user via client device 102 (e.g., in the instance that the user places a wager on a sporting event that is associated with a winning outcome).

Figure 5:
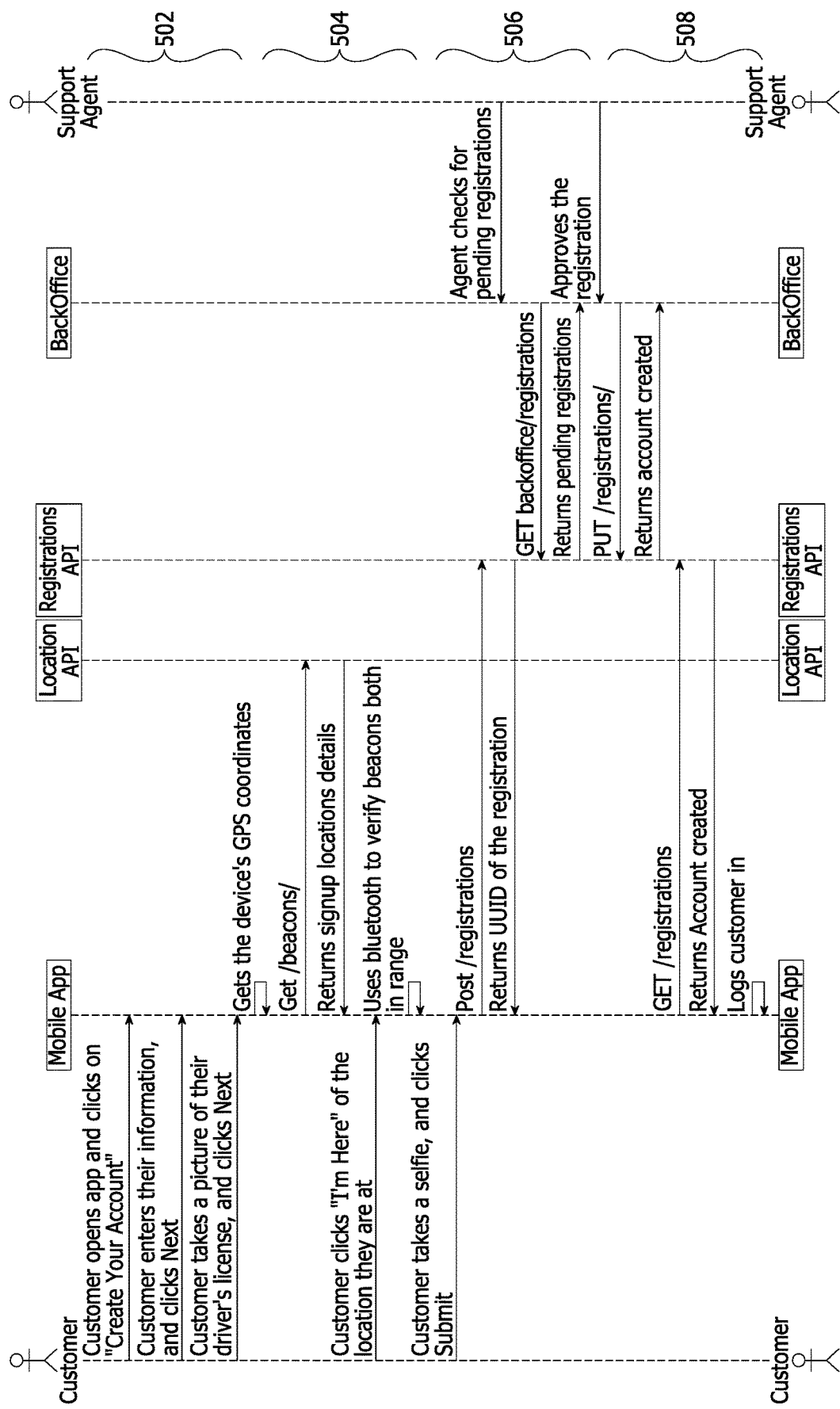
FIG. 5 is an interaction diagram illustrating an exemplary process for multi-factor location-based device verification.

FIG. 5 is an interaction diagram illustrating an exemplary process for multi-factor location-based device verification. In the exemplary embodiment, and as described herein, a user may open a mobile app, such as on client device 102, enter identifying information, such as a legal name, a user name, an address, a password, and the like, and/or take one or more pictures or photographs of their driver's license (e.g., the front, the back, or both the front and back of their driver's license) (step 502). In some embodiments, the mobile app may direct the user to a registration webpage. In other embodiments, the mobile app may provide a registration interface on a display of client device 102.

In the example embodiment, client device 102 receives one or more GPS coordinates of client device 102, as described herein, as well as beacon information associated with one or more beacons, from a backend server, such as web server 108 (e.g., a locations API running on web server 108) (step 504). In addition, client device 102 may receive an array of predefined signup locations, e.g., sports books, such as sports book 114, which may be ordered and/or presented on client device 102 in a list arranged by distance from the user's current GPS location. In at least some embodiments, the beacon information received by client device 102 from web server 108 may include a beacon identifier (or beacon identifiers) for each beacon within each sports book in the list of sports books returned by web server 108 and displayed on the user's client device 102. In some embodiments, web server 108 may provide information to client device 102 for the beacons 104a-b inside the sports book 114 selected by the user. As a result, when the user enters any of the sports books provided on the list, client device 102 may already store beacon information for verifying that the user is physically within the sports book 114. In some embodiments, as described, client device 102 may receive periodic updates of beacon identifier information, such as each time a beacon identifier rotates or changes to a new beacon identifier. In this manner, client device 102 may obtain and store an up-to-date list of beacon identifiers.

In response to arriving at sports book 114, in at least some embodiments, the user may interact with the mobile app on client device 102 to indicate that the user has arrived at sports book 114, such as by selecting an "I'm here" option displayed or provided by the mobile app, and in response, the user's location within sports book 114 may be verified using one or more beacon identifiers, as described herein (step 506). For example, in at least some embodiments, client device 102 may detect wireless beacon signals of wireless beacons 104a and 104b within sports book 114. In response to detecting the wireless beacon signals, client device 102 may, in addition, compare the beacon identifiers provided by each beacon 104a-b with beacon identifiers provided by or received from web server 108 for each of the wireless beacons 104a-b, and if the identifiers received from web server 108 match those detected within sports book 114 by client device 102, client device 102 may determine or verify that the user is actually physically located within sports book 114.

As described herein, in at least some embodiments, this phase of the verification process may also be performed, at least in part, on a backend portion of system 100, such as web server 108, where for example, web server 108 may receive the beacon identifiers detected by client device 102 and perform the comparison against beacon identifiers stored by web server 108 and/or database server 110 for beacons 104a-b. Moreover, as described herein, web server 108 may, in at least some embodiments, communicate with beacons 104a-b (e.g., via the network) to provide beacon identifiers for broadcast by each beacon 104a-b. As a result, in at least some embodiments, web server 108 may control the beacon identifiers broadcast by beacons 104a-b. In other embodiments, beacons 104a-b may independently generate beacon identifiers, in which case, beacons 104a-b may securely provide beacon identifiers to web server 108 for comparison against the beacon identifiers detected by client device 102, as variously described.

In response to verifying, based on the beacon identifiers, that the user is physically located within sports book 114, the mobile app on client device 102 may prompt the user to take a self-photograph, such as using a camera of client device 102. The user may take one or more self-photographs, and these may be submitted via the network to web server 108 (e.g., a registrations API running on web server 108). In response to submission by the user of the one or more self-photographs, web server 108 may provide the registration request initiated by the user, including the self-photograph, to an image processing system and/or a back office agent for verification or validation. For example, in at least some embodiments, an agent may receive the registration request, including the identifying and registration information entered by the user as well as the self-photograph, and the agent may compare the self-photograph to the photographs of the user's driver's license that were also taken by the user. In some embodiments, this process may, as described above, be automated and performed by a computer implementing image processing and/or machine learning tools. However, in either case, the agent (or computer system) may approve or deny the registration request, and the results of the photo verification may be provided to client device 102 (step 508). In some embodiments, the back office agent and/or computer processing the registration request may receive a plurality of registration requests, including self-photographs of a plurality of users who have initiated registration requests within a given period of time (e.g., within several minutes of one another), and these may be provided to the back office agent and/or batch processed together.

In response to approval or denial of a user's request for registration, the user may be notified, and system 100 may, if the registration request is approved, create a wagering account for the user. In response to creation of the wagering account, the user may be permitted to login to the wagering account to begin placing wagers on sporting events. For instance, once the user is logged in to a newly created/existing wagering account, and the location of client device 102 is verified as being within given sports book 114 and/or in a given gaming jurisdiction, web server 108 may grant the user access to the newly created/existing wagering account, whereupon the user may proceed to place one or more wagers on one or more sporting events in conjunction with sports book 114. For example, client device 102 may communicate with web server 108 to place wagers and receive wager outcomes in association with various sporting events. In addition, one or more awards, such as one or more monetary awards or credits associated with one or more monetary awards, may be provided to the user via client device 102 (e.g., in the instance that the user places a wager on a sporting event that is associated with a winning outcome).

Embodiments of the multi-factor location-based device verification system therefore enable, as described above, multi-factor verification of a physical location of a client device, such as a mobile communications device, within a predefined physical location, such as, for example, a casino sports book. In some embodiments, two location factors, such as first factor associated with GPS coordinates and a second factor associated with a wireless beacon, may be used. In other embodiments, two locations factors, each associated with respective wireless beacons, may be used. In addition, in some embodiments, a first factor associated with GPS coordinates and two location factors associated with wireless beacons may be used. Accordingly, in various embodiments, two-factor as well as three-factor verification processes are described. In some embodiments, four or more factors, such as three locations factors received from three wireless beacons and a GPS coordinate may be used to determine and/or verify a location of a user.

The system may further permit a user to register for a new wagering account. To this end, the system may ensure that the client device is physically located within the sports book during at least part of the account registration process. For example, in some embodiments, the system may permit the user to initiate a registration process from any physical location, such as any physical location that is within and/or without a sports book. However, in at least some embodiments, the system may require that the user physically enter a location of a sports book to complete a new account registration process. The physical location of the user within the sports book may be verified based upon a first location or verification factor, such as at least one GPS coordinate, and one or more second and/or third location or verification factors, such as unique identifiers broadcast by and received from one or more wireless beacons disposed within the casino sports book. The system may further register a user to a new wagering account based upon a comparison of a self-photograph of a user of the client device taken from the client device to a driver's license photograph.

Exemplary technical effects of the multi-factor location-based device verification system described herein include, for example: (a) determination of a client device location based upon a first location factor; (b) indication of a predefined location, such as a casino sports book, within a predefined distance of the client device; (c) verification of the device location based upon the first location factor; (d) determination of the client device location based upon a second location factor and/or a third location factor broadcast by one or more wireless beacons disposed within the sports book; (e) verification of the device location based upon the second and/or third location factors; and (f) creation of a new wagering account based upon the multi-factor location-based verification and authentication of an identity of a user of the client device based upon a comparison of a self-photograph taken from the client device to a driver's license photograph.

Exemplary embodiments of a multi-factor location-based device verification system and related components are described above in detail. The system is not limited to the specific embodiments described herein, but rather, components of systems and/or steps of the methods may be utilized independently and separately from other components and/or steps described herein. For example, the configuration of components described herein may also be used in combination with other processes, and is not limited to practice with the systems and related methods as described herein. Rather, the exemplary embodiment can be implemented and utilized in connection with many applications where device location verification is desired.

Although specific features of various embodiments of the present disclosure may be shown in some drawings and not in others, this is for convenience only. In accordance with the principles of the present disclosure, any feature of a drawing may be referenced and/or claimed in combination with any feature of any other drawing.

This written description uses examples to disclose the embodiments of the present disclosure, including the best mode, and also to enable any person skilled in the art to practice the disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for multi-factor location-based device verification, the system comprising:
    a processor; and
    a non-transitory, tangible, computer-readable storage medium having instructions stored thereon that, in response to execution by the processor, cause the processor to perform operations comprising:
        receiving, from a client device of a user, a request to register for a new wagering account;
        receiving, from the client device, a first location factor, the first location factor including global positioning system (GPS) data received from a source device located outside a predefined area, the first location factor being used to provide map directions to the predefined area;
        receiving, from the client device, a second location factor, the second location factor including information received from a first wireless beacon located within the predefined area;
        receiving, from the client device, a third location factor, the third location factor including information received from a second wireless beacon located within the predefined area;
        determining, based at least upon the second location factor and the third location factor, that the client device is within the predefined area;
        in response to the determining, requesting a user photo taken by the client device;
        receiving, from the client device, the requested user photo; and
        creating, in response to the determining and the user photo, the new wagering account for the user of the client device.

2. The system of claim 1, wherein the first location factor includes at least one GPS coordinate, and wherein the second location factor includes a unique identifier associated with the first wireless beacon, and wherein the third location factor includes a different unique identifier associated with the second wireless beacon.

3. The system of claim 2, wherein the instructions further cause the processor to perform operations comprising receiving the unique identifier associated with the first wireless beacon and the different unique identifier associated with the second wireless beacon, wherein the unique identifier associated with the first wireless beacon is a randomly generated combination of hexadecimal digits, and wherein the different unique identifier associated with the second wireless beacon is a randomly generated combination of hexadecimal digits.

4. The system of claim 1, wherein the instructions further cause the processor to perform operations comprising:
    analyzing the second location factor to determine that the client device is within the predefined area; and
    analyzing the third location factor to determine at least one of i) that the client device is within the predefined area, or ii) that the client device is near an edge of the predefined area.

5. The system of claim 1, wherein the instructions further cause the processor to perform operations comprising:
    generating the second location factor and the third location factor;
    storing the second location factor and the third location factor;
    providing the second location factor to the first wireless beacon, wherein the first wireless beacon is configured to broadcast the second location factor to the client device;
    providing the third location factor to the second wireless beacon, wherein the second wireless beacon is configured to broadcast the third location factor to the client device; and
    comparing at least one of the second location factor received from the client device or the third location factor received from the client device to the stored second location factor or the stored third location factor, respectively, to determine whether the client device is within the predefined area.

6. The system of claim 1, wherein the instructions further cause the processor to perform operations comprising:
    comparing the second location factor received from the client device to a stored second location factor to determine whether the second location factor received from the client device matches the stored second location factor;
    comparing the third location factor received from the client device to a stored third location factor to determine whether the third location factor received from the client device matches the stored third location factor; and
    one of:
        i) in response to determining that both of the second location factor received from the client device matches the stored second location factor and the third location factor received from the client device matches the stored third location factor, determining that the client device is within the predefined area, or
        ii) in response to determining that at least one of the second location factor received from the client device does not match the stored second location factor or that the third location factor received from the client device does not match the stored third location factor, determining that the client device is not within the predefined area.

7. The system of claim 1, wherein the instructions further cause the processor to perform operations comprising:
    determining, based upon the first location factor, that the client device is outside the predefined area; and
    providing a message to the client device indicating a location of the predefined area and instructing the user of the client device to travel to the location of the predefined area.

8. The system of claim 1, wherein the requested user photo includes a photograph of the user's face captured from a camera of the client device, and wherein creating the new wagering account further comprises:
    receiving, from the client device, a photograph of a driver's license of the user captured from the camera of the client device, the photograph of the driver's license including a driver's license photograph;
    comparing the photograph of the user's face captured from the camera to the driver's license photograph; and
    authenticating the identity of the user based upon the comparing.

9. The system of claim 1, wherein the instructions further cause the processor to perform operations comprising:
receiving, from the client device, at least one wager;
determining an outcome based upon the at least one wager; and
providing, based upon the determining, an award to the user based upon the outcome.

10. The system of claim 9, wherein the predefined location is a sports book, and wherein the at least one wager is received in association with a sporting event and the outcome is an outcome of the sporting event.

11. A method for multi-factor location-based device verification, the method comprising:
receiving, by a processor and from a client device of a user, a request to register for a new wagering account;
receiving, by the processor and from the client device, a first location factor, the first location factor including global positioning system (GPS) data received from a source device located outside a predefined area;
receiving, by the processor and from the client device, a second location factor, the second location factor including information received from a first wireless beacon located within the predefined area;
receiving, by the processor and from the client device, a third location factor, the third location factor including information received from a second wireless beacon located within the predefined area;
determining, by the processor and based at least upon the second location factor and the third location factor, that the client device is within the predefined area;
in response to the determining, requesting a user photo taken by the client device:
receiving, from the client device, the requested user photo; and
creating, by the processor and in response to the determining and the user photo, the new wagering account for the user of the client device.

12. The method of claim 11, further comprising:
generating, by the processor, the second location factor and the third location factor;
storing, by the processor, the second location factor and the third location factor;
providing, by the processor, the second location factor to the first wireless beacon, wherein the first wireless beacon is configured to broadcast the second location factor to the client device;
providing, by the processor, the third location factor to the second wireless beacon, wherein the second wireless beacon is configured to broadcast the third location factor to the client device; and
comparing, by the processor, at least one of the second location factor received from the client device or the third location factor received from the client device to the stored second location factor or the stored third location factor, respectively, to determine whether the client device is within the predefined area.

13. The method of claim 11, further comprising:
comparing, by the processor, the second location factor received from the client device to a stored second location factor to determine whether the second location factor received from the client device matches the stored second location factor;
comparing, by the processor, the third location factor received from the client device to a stored third location factor to determine whether the third location factor received from the client device matches the stored third location factor; and one of:
i) in response to determining that both of the second location factor received from the client device matches the stored second location factor and the third location factor received from the client device matches the stored third location factor, determining that the client device is within the predefined area, or
ii) in response to determining that at least one of the second location factor received from the client device does not match the stored second location factor or that the third location factor received from the client device does not match the stored third location factor, determining that the client device is not within the predefined area.

14. The method of claim 11, further comprising:
determining, by the processor and based upon the first location factor, that the client device is outside the predefined area; and
providing, by the processor, a message to the client device indicating a location of the predefined area and instructing the user of the client device to travel to the location of the predefined area.

15. The method of claim 11, wherein the requested user photo includes a photograph of the user's face captured from a camera of the client device, and wherein the method further comprises:
receiving, by the processor and from the client device, a photograph of a driver's license of the user captured from the camera of the client device, the photograph of the driver's license including a driver's license photograph;
comparing, by the processor, the photograph of the user's face captured from the camera to the driver's license photograph;
authenticating, by the processor, the identity of the user based upon the comparing;
receiving, by the processor and from the client device, at least one wager;
determining, by the processor, an outcome based upon the at least one wager; and
providing, by the processor and based upon the determining, an award to the user based upon the outcome.

16. An article of manufacture comprising a tangible, non-transitory, computer-readable storage medium having instructions stored thereon, which when executed by a processor for multi-factor location-based device verification, cause the processor to perform operations comprising:
receive, from a client device of a user, a request to register for a new wagering account;
receive, from the client device, a first location factor, the first location factor including global positioning system (GPS) data received from a source device located outside a predefined area;
receive, from the client device, a second location factor, the second location factor including information received from a first wireless beacon located within the predefined area;
receive, from the client device, a third location factor, the third location factor including information received from a second wireless beacon located within the predefined area;
determine, based at least upon the second location factor and the third location factor, that the client device is within the predefined area; in response to the determining, requesting a user photo taken by the client device;
receiving, from the client device, the requested user photo; and create, in response to the determining and the user photo, the new wagering account for the user of the client device.

17. The article of claim 16, wherein the instructions further cause the processor to perform operations comprising:
generating the second location factor and the third location factor;
storing the second location factor and the third location factor;
providing the second location factor to the first wireless beacon, wherein the first wireless beacon is configured to broadcast the second location factor to the client device;
providing the third location factor to the second wireless beacon, wherein the second wireless beacon is configured to broadcast the third location factor to the client device; and
comparing at least one of the second location factor received from the client device or the third location factor received from the client device to the stored second location factor or the stored third location factor, respectively, to determine whether the client device is within the predefined area.

18. The article of claim 16, wherein the instructions further cause the processor to perform operations comprising:
comparing the second location factor received from the client device to a stored second location factor to determine whether the second location factor received from the client device matches the stored second location factor;
comparing the third location factor received from the client device to a stored third location factor to determine whether the third location factor received from the client device matches the stored third location factor; and
one of:
i) in response to determining that both of the second location factor received from the client device matches the stored second location factor and the third location factor received from the client device matches the stored third location factor, determining that the client device is within the predefined area, or
ii) in response to determining that at least one of the second location factor received from the client device does not match the stored second location factor or that the third location factor received from the client device does not match the stored third location factor, determining that the client device is not within the predefined area.

19. The article of claim 16, wherein the instructions further cause the processor to perform operations comprising:
determining, based upon the first location factor, that the client device is outside the predefined area; and
providing a message to the client device indicating a location of the predefined area and instructing the user of the client device to travel to the location of the predefined area.

20. The article of claim 16, wherein the requested user photo includes a photograph of the user's face captured from a camera of the client device, and wherein the instructions further cause the processor to perform operations comprising:
receiving, from the client device, a photograph of a driver's license of the user captured from the camera of the client device, the photograph of the driver's license including a driver's license photograph;
comparing the photograph of the user's face captured from the camera to the driver's license photograph;
authenticating the identity of the user based upon the comparing;
receiving, from the client device, at least one wager;
determining an outcome based upon the at least one wager; and
providing, based upon the determining, an award to the user based upon the outcome.

\* \* \* \* \*